US010169835B2

(12) United States Patent
Gu et al.

(10) Patent No.: US 10,169,835 B2
(45) Date of Patent: Jan. 1, 2019

(54) ATTRIBUTE ENERGY CONSUMPTION THROUGH POWER SENSING AND USER LOCALIZATIONS (71) Applicant: International Business Machines Corporation, Armonk, NY (US)

(72) Inventors: Yu Gu, Cedar Park, TX (US); Inseok Hwang, Austin, TX (US); Su Liu, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 14/860,304

(22) Filed: Sep. 21, 2015

(65) Prior Publication Data
US 2017/0082994 A1 Mar. 23, 2017

(51) Int. Cl.
*G05B 19/048* (2006.01)
*G06Q 50/06* (2012.01)
*G06Q 10/06* (2012.01)
*G05B 15/02* (2006.01)

(52) U.S. Cl.
CPC ........... *G06Q 50/06* (2013.01); *G05B 19/048* (2013.01); *G06Q 10/06* (2013.01); *G05B 15/02* (2013.01); *G05B 2219/2639* (2013.01)

(58) Field of Classification Search
CPC .......... G05B 19/048; G05B 2219/2639; G05B 15/02
USPC .................................. 700/291, 33, 296, 276
See application file for complete search history.

(56) References Cited

U.S. PATENT DOCUMENTS

| 5,544,036 A * | 8/1996 | Brown, Jr. ......... G05D 23/1905 340/12.52 |
| 7,778,734 B2 * | 8/2010 | Oswald .................. G05B 15/02 340/662 |
| 8,009,042 B2 | 8/2011 | Steiner et al. |
| 2010/0249955 A1 | 9/2010 | Sitton |
| 2012/0065789 A1 * | 3/2012 | Scelzi .................... G01K 17/20 700/291 |
| 2013/0046703 A1 | 2/2013 | Ambati et al. |

(Continued)

OTHER PUBLICATIONS

Jiang et al., "Experiences with a high-fidelity wireless building energy auditing network," Proceedings of the 7th ACM Conference on Embedded Networked Sensor Systems, Nov. 2009, Berkeley, California, pp. 113-126.

(Continued)

*Primary Examiner* — Caleen Sullivan
(74) *Attorney, Agent, or Firm* — VanLeeuwen & VanLeeuwen; Bryan S. Bortnick (57) ABSTRACT

An approach is provided for attributing energy usage to individual occupants in an area, such as a building or office space. The approach receives current locations of occupants from sensors deployed in the area being monitored. Identifiers corresponding to various occupants are determined, such as by tracking the occupants' mobile telephone location, biometrics such as facial recognition, or other device-enabled means of identifying people. Energy consumption values corresponding to energy consuming devices are received and device locations are identified. The approach further attributes the amount of energy consumed by each of the occupants, with the energy attribution being based on the occupants' current locations and the device locations.

14 Claims, 9 Drawing Sheets

(56) References Cited

U.S. PATENT DOCUMENTS

2015/0046104 A1  2/2015 Chang et al.
2016/0103462 A1* 4/2016 Ainsley .................. G05B 15/02
                                                    700/276

OTHER PUBLICATIONS

Jung et al., "EnergyTrack : Sensor-Driven Energy Use Analysis System," Proceedings of the 5th ACM Workshop on Embedded Systems for Energy-Efficient Buildings, Nov. 2013, Rome, Italy, 8 pages.
Pei-Yi et al., "Energy Diet: Energy Feedback on a Bathroom Scale," Proceedings of the 2014 ACM International Joint Conference on Pervasive and Ubiquitous Computing (UbiComp '14), Sep. 2014, Seattle, Washington, pp. 435-446.
Gupta et al., "ElectriSense: Single-Point Sensing Using EMI for Electrical Event Detection and Classification in the Home," Proceedings of the 12th ACM international conference on Ubiquitous computing, Sep. 2010, Copenhagen, Denmark, pp. 139-148.
Kill A Watt CO2 Wireless Specifications, P3 International Corporation, New York, NY, 2014, 1 page.

\* cited by examiner

ATTRIBUTE ENERGY CONSUMPTION THROUGH POWER SENSING AND USER LOCALIZATIONS

BACKGROUND

Technical Field

This disclosure relates to power consumption, and more particularly to attributing power consumption to particular individuals.

Description of Related Art

Virtually everyone consumes energy for entertaining, working, transportation, communicating and for controlling the ambient temperature of locations in which people live and work. It is estimated that the United States consumes approximately one fourth of the world's energy. Despite this vast consumption, it is difficult, if not impossible, to attribute an amount of energy consumed to various individuals. This is especially true in workplace environments where large numbers of energy consuming devices are utilized by various workers. Some of these energy consuming devices might not be utilized by any of the workers, but such non-usage is also very difficult to ascertain.

SUMMARY

An approach is provided for attributing energy usage to individual occupants in an area, such as a building or office space. The approach receives current locations of occupants from sensors deployed in the area being monitored. Identifiers corresponding to various occupants are determined, such as by tracking the occupants' mobile telephone location, biometrics such as facial recognition, or other device-enabled means of identifying people. Energy consumption values corresponding to energy consuming devices are received and device locations are identified. The approach further attributes the amount of energy consumed by each of the occupants, with the energy attribution being based on the occupants' current locations and the device locations.

The foregoing is a summary and thus contains, by necessity, simplifications, generalizations, and omissions of detail; consequently, those skilled in the art will appreciate that the summary is illustrative only and is not intended to be in any way limiting. Other aspects, features, and advantages of the present disclosure will be apparent in the non-limiting detailed description set forth below.

BRIEF DESCRIPTION OF THE DRAWINGS

Embodiments of the present invention may be better understood, and its numerous objects, features, and advantages made apparent to those skilled in the art by referencing the accompanying drawings, wherein.

DETAILED DESCRIPTION

FIGS. 1-9 show an approach for attributing energy consumption through power sensing and user localizations. The approach constructs a temporal occupancy heat map over time. Essentially, the occupancy heat map uses indoor localization technology to track the locations of occupants and power consuming devices over time. The energy heat map uses power sensing/monitoring devices to track the real-time energy consumption of power consuming devices. Correlating the location and energy consumption heat map with graph matching and graph analysis, such that the energy consumption of devices can be systematically attributed to individual users, and sources of energy wasted can be identified.

A device location map is constructed to have a basic map of devices in the area being monitored. The approach retrieves the locations of conference rooms (including projector, etc), microwaves, elevators, printers, desktops, servers, and the like. The energy consumption data is collected for devices and power sensing/monitoring devices are used to track the real-time energy consumption of power consuming devices. A people occupancy map is constructed. Indoor localization technology is used to track the locations of occupants. This technology includes people's mobile phones, smart watches, other smart devices, etc.

The device-people attribution graph is then built. If a device is being utilized by an occupant, either proactively or passively, then there is a connection between the device node and the occupant node on the graph. In one embodiment, an occupant is deemed to be utilizing devices if the occupant is within the service range of the device (via positioning technology) or directly using the device, such as a computer system. The approach compares the people occupancy map with the device location map. A graph matching technique can be used. By determining that an energy consuming device is at a location at a time point and particular occupants were at the same location, then the occupant nodes can be connected to the device nodes.

The energy used by each occupant is then computed. For each occupant node, the amortized energy from each device is calculated based on the number of occupants using the device. The total energy consumed by the device d will be averaged among the users using it. In this manner, the total energy used by any occupant is calculated as the sum of all energy consumed by the devices pointing to the occupant node.

The approach also Identifies the devices that are not being used by any occupants and thus the energy wasted amount is computed. If there are devices nodes in the graph that do not have connections to occupant nodes, it signifies that such devices are not being used and the energy consumed by such device is being wasted.

Embodiments of the present invention may be a system, a method, and/or a computer program product. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
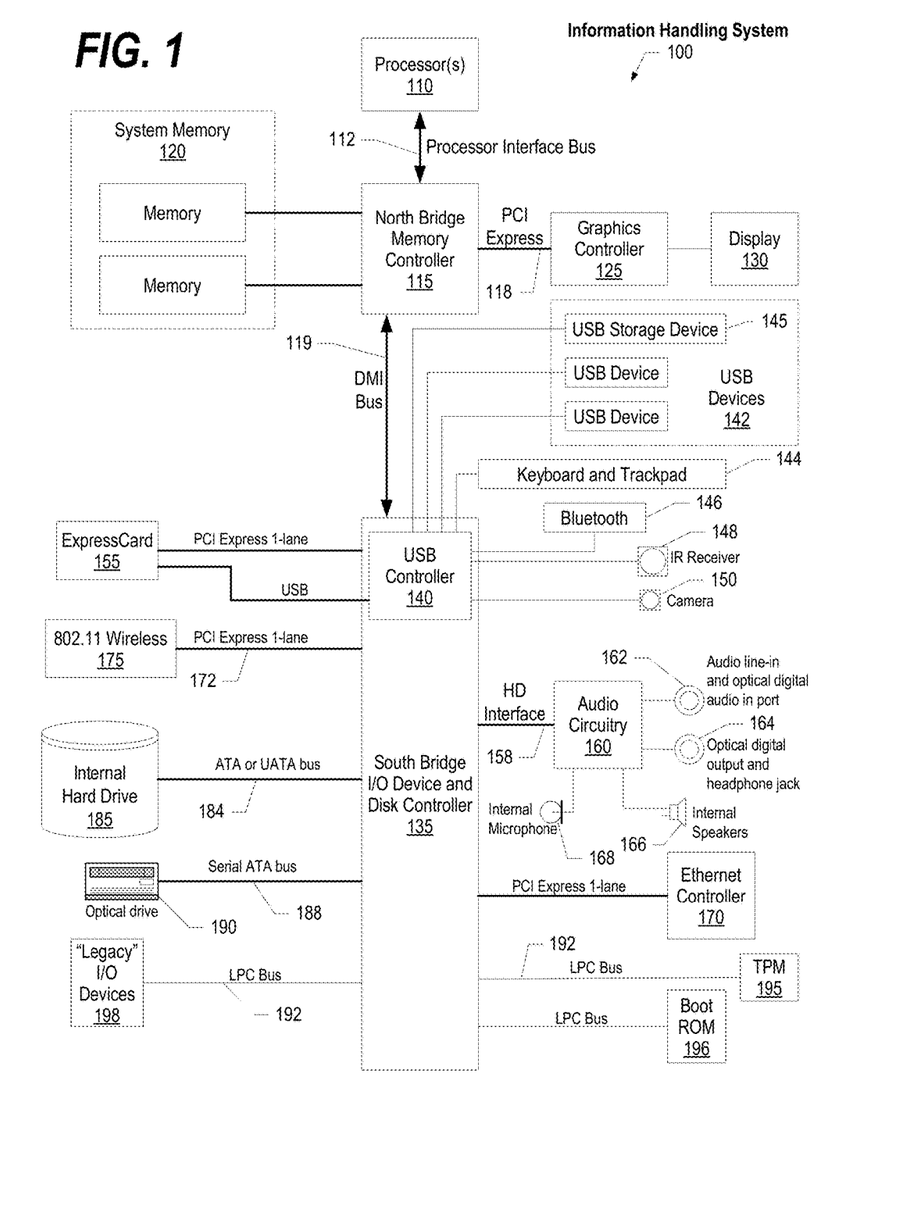
FIG. 1 depicts a block diagram of a processor and components of an information handling system.
Figure 2:
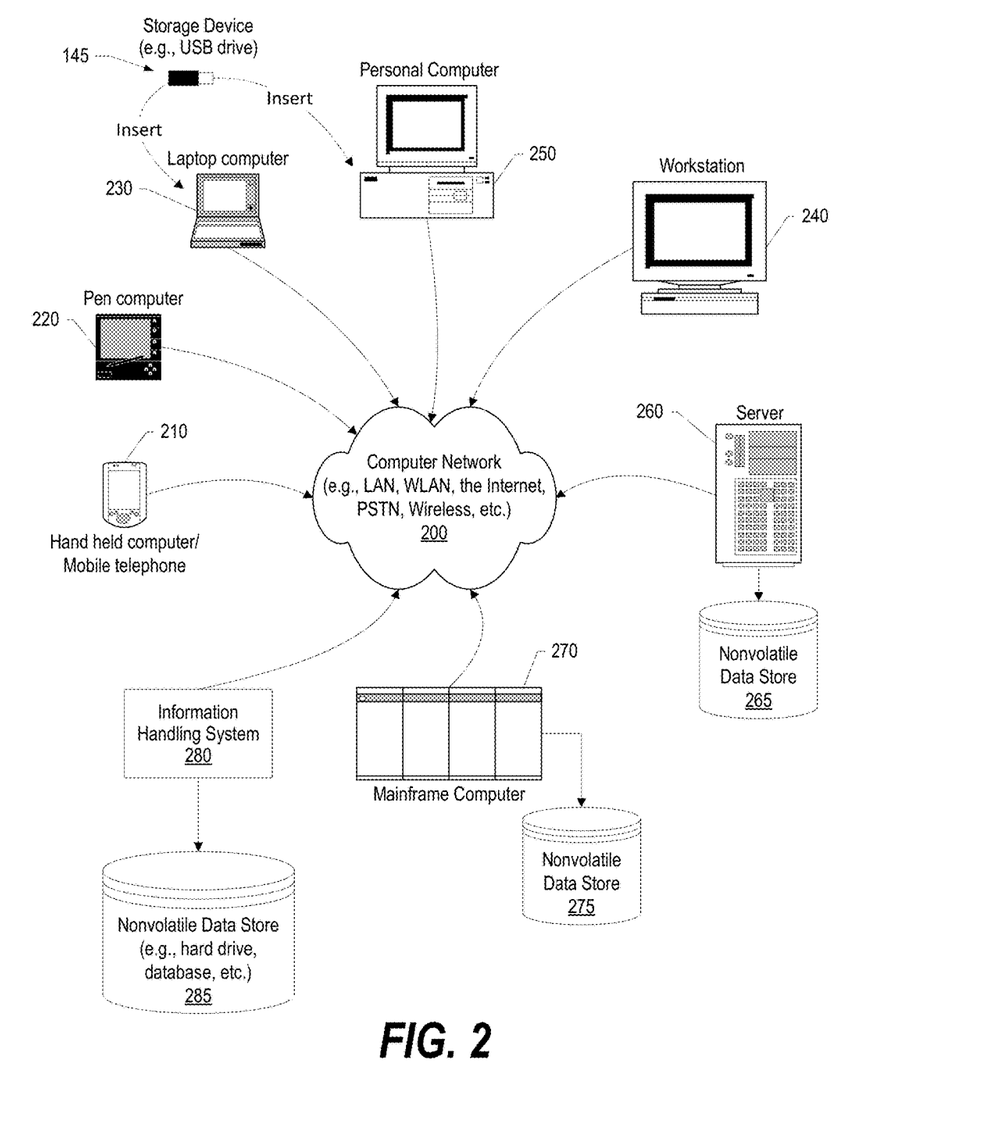
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
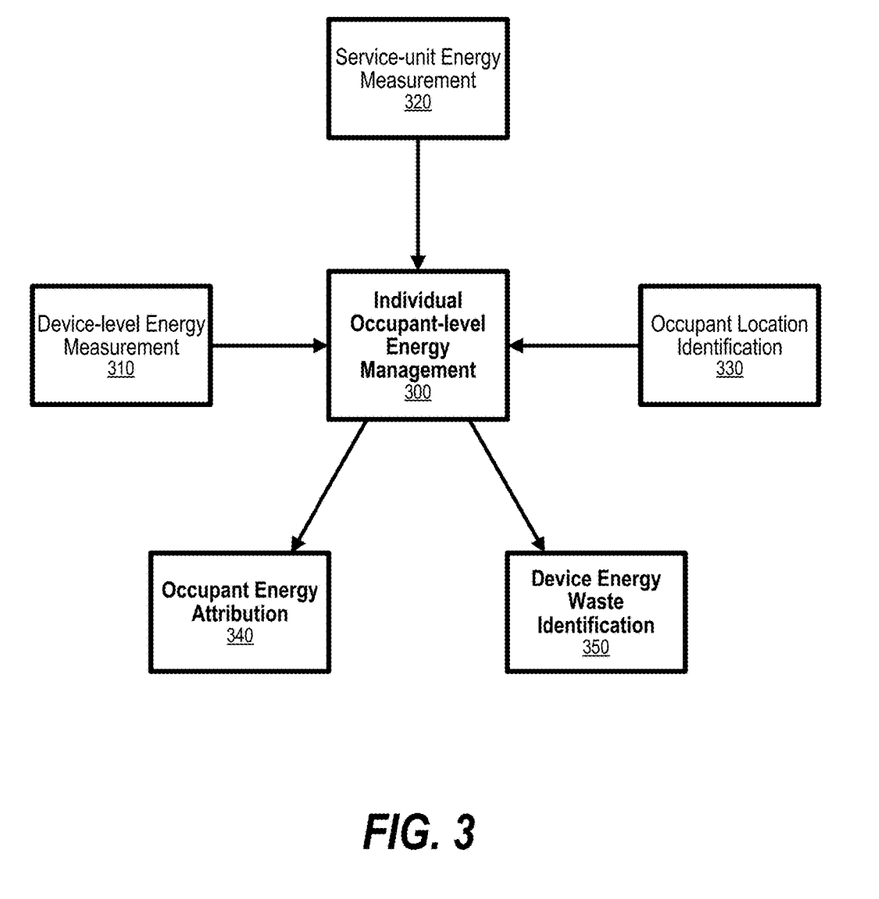
FIG. 3 is a component diagram depicting interaction between the components that attribute energy consumption through power sensing and user localizations.

FIG. 3 is a component diagram depicting interaction between the components that attribute energy consumption through power sensing and user localizations. Process 300 is the Individual Occupant-level Energy Management process that attributes energy consumption to individual occupants of an area, such as a building or office space. Process 300 receives device and occupant data from various sources. Process 300 retrieves the device-level energy measurement data 310 from sensors, such as electric consumption connectors, associated with various devices. Process 300 also receives service-unit energy measurement data 320 corresponding to a service unit, such as an energy distribution panel. Process 300 also receives occupant location identification data 330 pertaining to any number of occupants in the area being monitored. Occupant location identification can be retrieved from a variety of sensors such as proximity detectors, biometric sensors (e.g., facial recognition sensors, etc.), as well as mobile devices that uniquely identify particular occupants (e.g., mobile telephone, smart devices, smart watches, etc.). Process 300 generates occupant energy attribution data 340 that attributes energy consumption to the various occupants found in the area. Process 300 also generates device energy waste data 350 that identifies devices that are consuming energy but not being utilized by any of the occupants.

Figure 4:
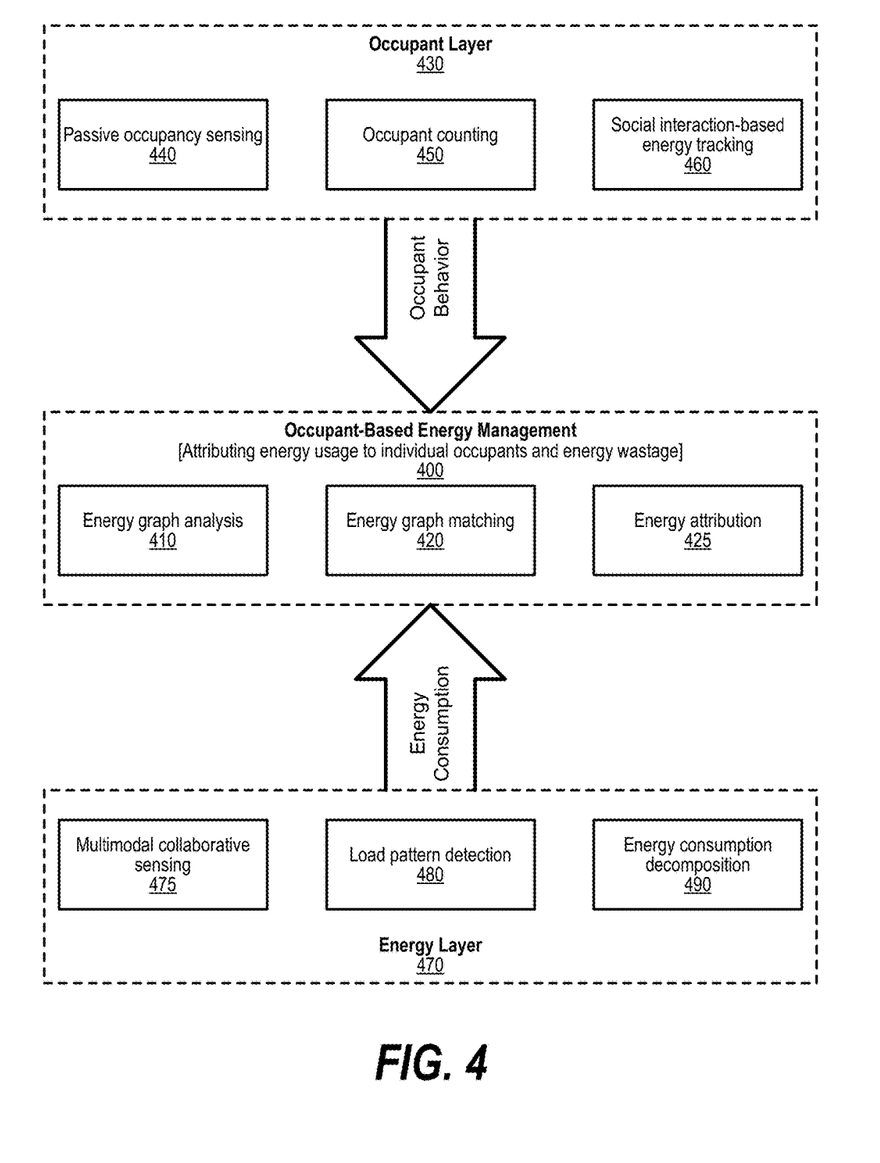
FIG. 4 is a layer diagram depicting the various layers and functions to provide occupant-based energy management.

FIG. 4 is a layer diagram depicting the various layers and functions to provide occupant-based energy management. Occupant-based energy management layer 400 includes functions that attribute energy usage to individual occupants and also identifies energy wastage. Layer 400 receives occupant behavior data from occupant layer 430 and energy consumption data from energy layer 470. The functions performed in occupant-based energy management layer 400 include energy graph analysis 410, energy graph matching 420, and energy attribution 425. Occupant layer 430 collects occupant behavior data to send to occupant-based energy management layer 400 by performing various functions. These functions include passive occupancy sensing function 440, occupant counting function 450, and social interaction-based energy tracking function 460. Energy layer 470 collects energy data pertaining to energy consuming devices to send to occupant-based energy management layer 400 by performing various functions. These functions include multimodal collaborative sensing function 475, load pattern detection function 480, and energy consumption decomposition function 490.

Figure 5:
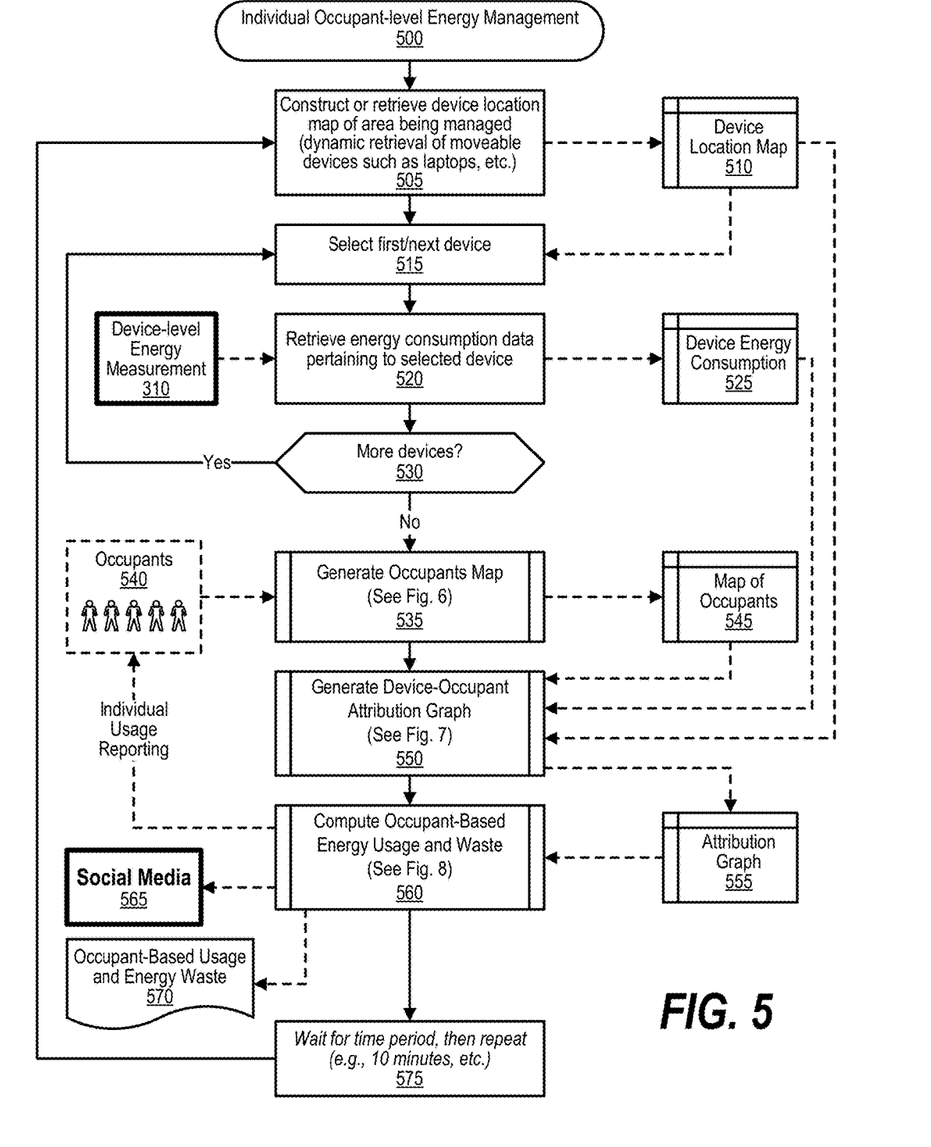
FIG. 5 is a flowchart showing steps that perform individual occupant-level energy management.

FIG. 5 is a flowchart showing steps that perform individual occupant-level energy management. FIG. 5 processing commences at 500 and shows the steps taken by a process that performs individual Occupant-level Energy Management. At step 505, the process constructs or retrieves the device location map corresponding to the area being managed, such as a building or work place. Dynamic retrieval of some moveable devices, such as laptop computers, etc., is also performed by detecting the location of such movable devices. Other location data pertaining to more "fixed" energy consuming devices can be retrieved from device location map 510. At step 515, the process selects the first device from the list of devices constructed at step 505. At step 520, the process retrieves the energy consumption data pertaining to the selected device from device-level energy measurement data stores 310, such as power monitors that connect the device to a wall outlet, etc. Step 520 stores the energy consumption data pertaining to the selected device in memory area 525. The process determines as to whether there are more devices to process from the list (decision 530). If there are more devices to process, then decision 530 branches to the 'yes' branch which loops back to step 515 to select and process the next device from the list. This looping continues until there are no more devices to process, at which point decision 530 branches to the 'no' branch exiting the loop.

Figure 6:
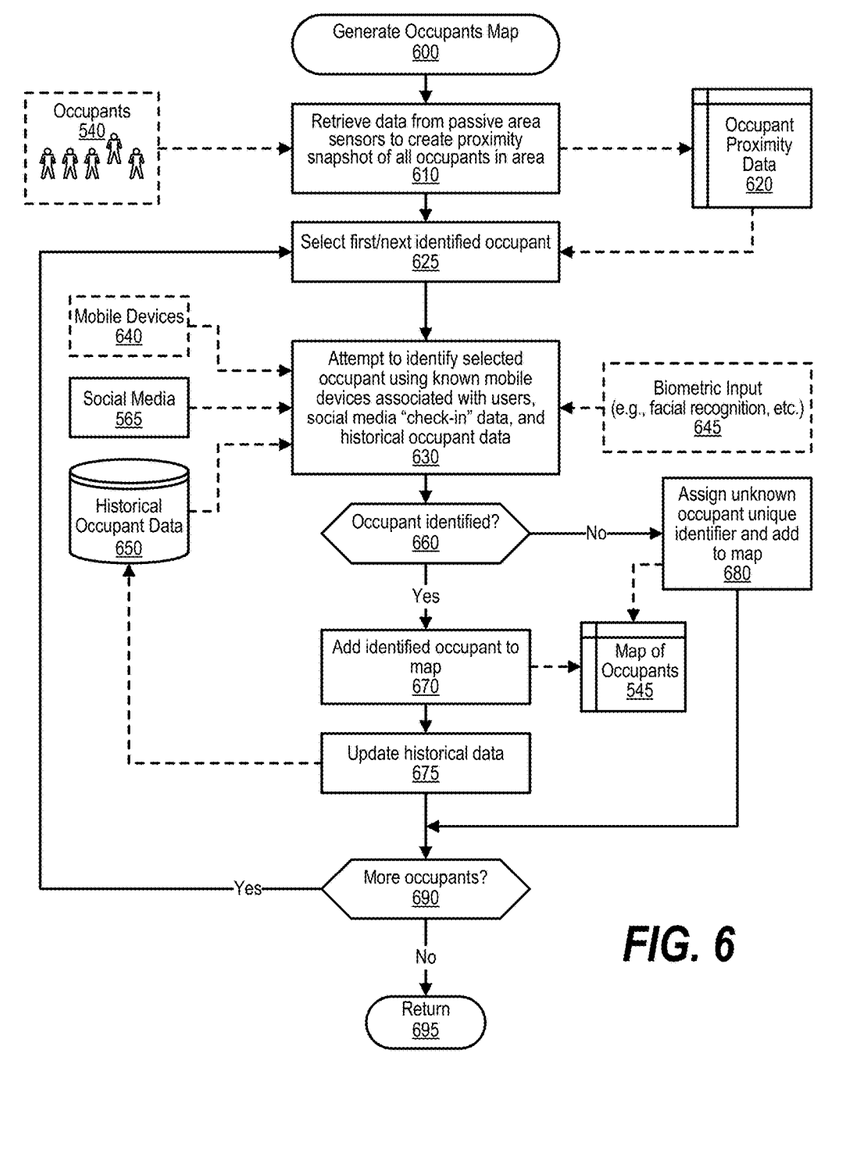
FIG. 6 is a flowchart showing steps that generate an occupants map of an area.

At predefined process 535, the process performs the Generate Occupants Map routine (see FIG. 6 and corresponding text for processing details). Predefined process 535 retrieves occupant data from sensors that sense the presence of occupants in the area being monitored and results in a map of occupants that is stored in memory area 545.

Figure 7:
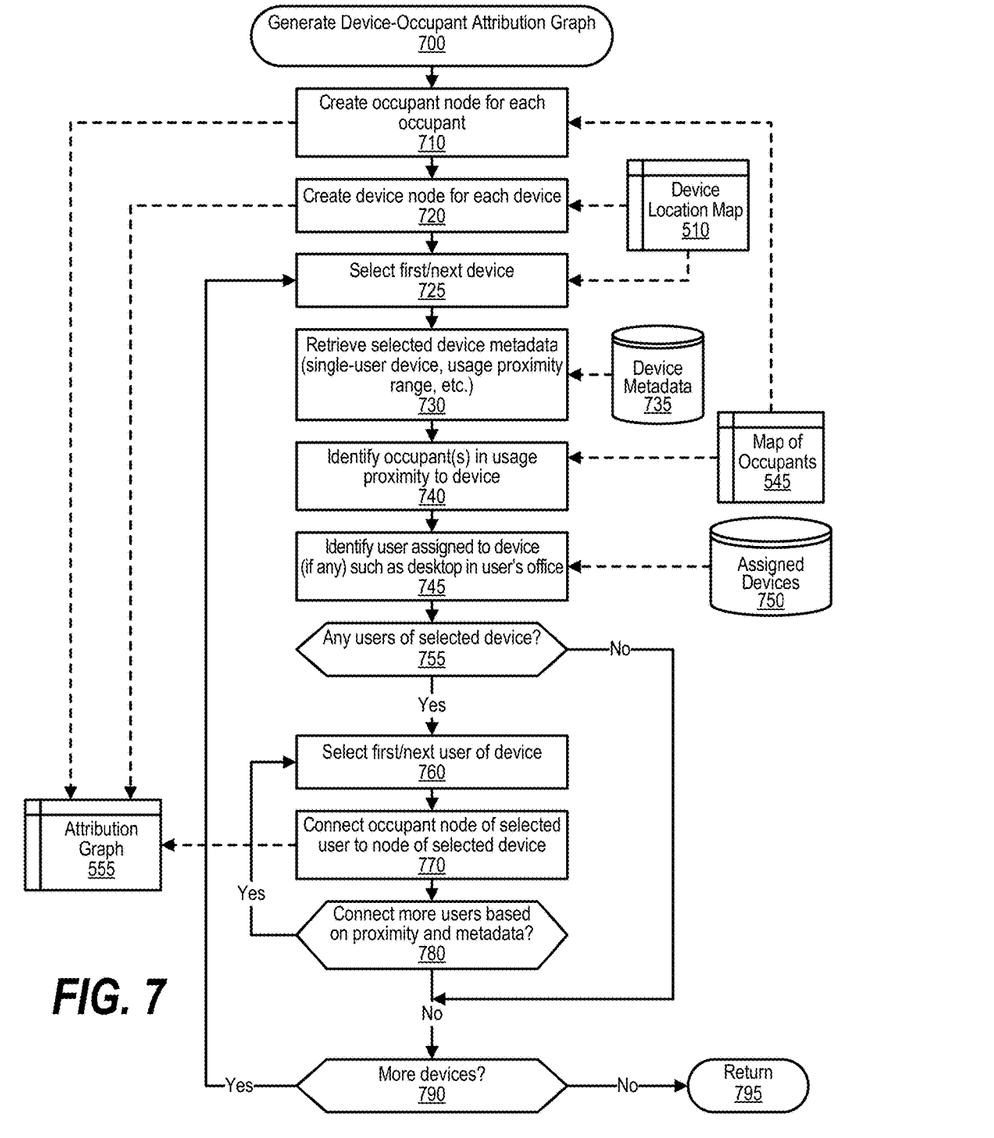
FIG. 7 is a flowchart showing steps that generate a device-occupant attribution graph.

At predefined process 550, the process performs the Generate Device-Occupant Attribution Graph routine (see FIG. 7 and corresponding text for processing details). Predefined process 550 receives device energy consumption data from memory area 525 and occupant location data from memory area 545. Predefined process 550 results in an energy attribution graph that is stored in memory area 555.

Figure 8:
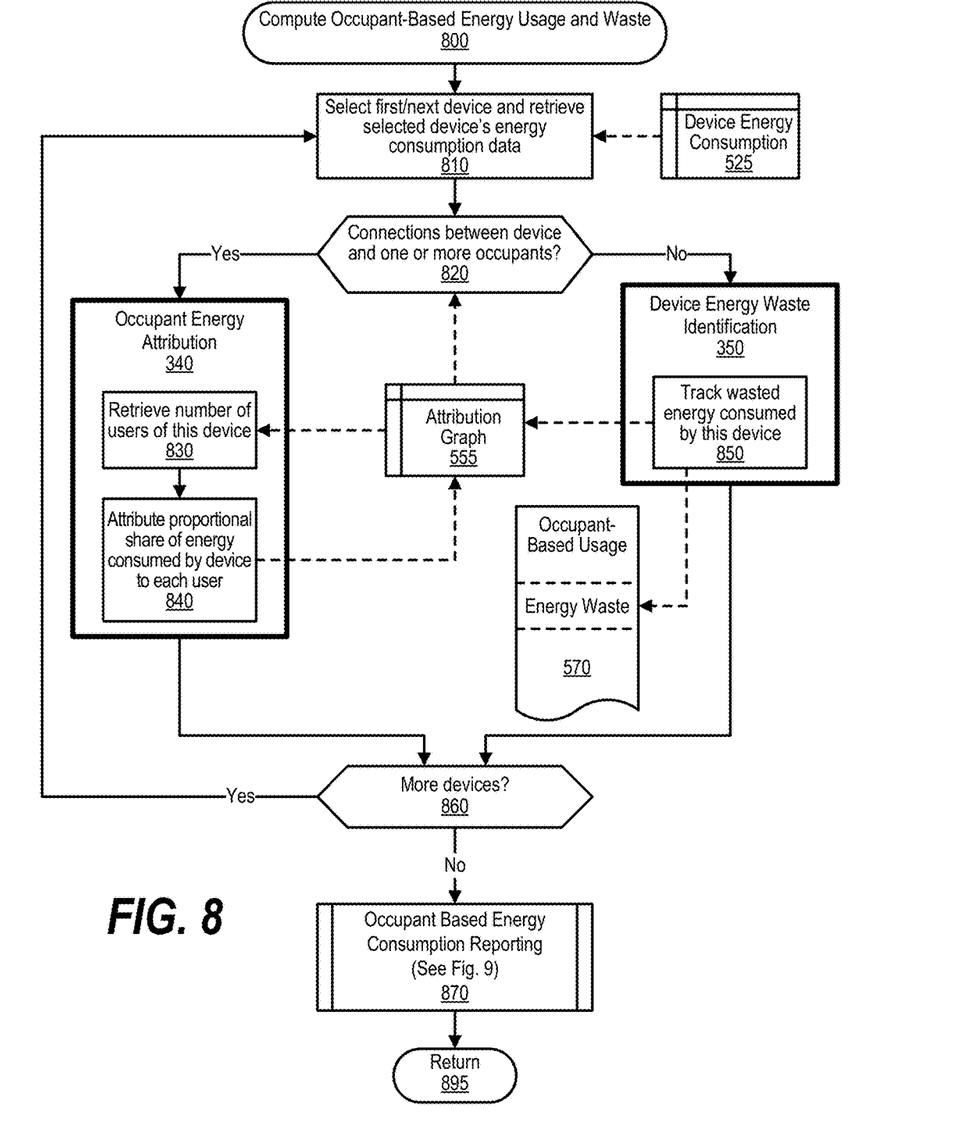
FIG. 8 is a flowchart showing steps that compute occupant-based energy usage and waste.

At predefined process 560, the process performs the Compute Occupant-Based Energy Usage and Waste routine (see FIG. 8 and corresponding text for processing details). Predefined process 560 retrieves the energy attribution graph from memory area 555 and reports energy usage and energy waste to individual occupants 540, social media websites 565, and various reports 570. The process shown above repeats at whatever time interval is desired. At step 575, the process waits for such time period to elapse and then loops back to step 505 to repeat the process.

FIG. 6 is a flowchart showing steps that generate an occupants map of an area. FIG. 6 processing commences at 600 and shows the steps taken by a process that generates the occupants map for a given area. At step 610, the process retrieves data from passive area sensors to create proximity snapshot of all occupants 540 that are currently in the area that is being monitored. Step 610 stores the occupant proximity data in memory area 620.

At step 625, the process selects the first identified occupant from memory area 620. At step 630, the process attempts to identify the selected occupant using known mobile devices associated with users, social media "check-in" data, biometric data, and historical occupant data. Step 630 retrieves mobile device data from mobile devices 640 associated with various occupants, such as mobile telephones, smart watches, other smart devices, etc. Step 630 can also retrieve biometric input data 645, such as facial recognition data, from digital cameras located throughout the area. Step 630 further retrieves historical occupant data from data store 650. Historical occupant data provides a historical tracking of the various occupants in various places in the area being monitored. For example, an occupant with an office might have a great deal of historical data showing the occupant in the assigned office. Step 630 can also retrieve location data, such as "check-in" data, from social media websites 565.

The process determines as to whether the selected occupant was able to be identified (decision 660). If the selected occupant was able to be identified, then decision 660 branches to the 'yes' branch to perform steps 670 and 675. On the other hand, if the selected occupant was unable to be identified, then decision 660 branches to the 'no' branch to perform step 680. If the selected occupant was able to be identified, then at step 670, the process adds the identified occupant to the occupant map stored in memory area 545 and, at step 675, the process updates historical data with additional tracking information for this occupant. On the other hand, if the selected occupant was unable to be identified, then at step 680, the process assigns the unknown occupant a unique identifier and adds the unknown occupant to the occupant map stored in memory area 545.

The process determines as to whether there are more occupants that were detected and that need to be processed as described above (decision 690). If there are more occupants that were detected and that need to be processed, then decision 690 branches to the 'yes' branch which loops back to step 625 to select and process the next occupant from memory area 620. This looping continues until there are no more occupants to process, at which point decision 690 branches to the 'no' branch exiting the loop. FIG. 6 processing thereafter returns to the calling routine (see FIG. 5) at 695.

FIG. 7 is a flowchart showing steps that generate a device-occupant attribution graph. FIG. 7 processing commences at 700 and shows the steps taken by a process that generates the Device-Occupant Attribution Graph. At step 710, the process creates an occupant node for each occupant by retrieving the occupants from memory area 545 and storing the created occupant nodes in attribution graph (memory area 555). At step 720, the process creates a device node for each device by retrieving the energy consuming devices from memory area 510 and storing the created device nodes in attribution graph (memory area 555).

At step 725, the process selects the first device from the device location map (memory area 510). At step 730, the process retrieves metadata pertaining to the selected device from device metadata data store 735. The device metadata includes usage characteristics pertaining to the device such as whether the device is a single-user device, a multi-user device, the usage proximity range of the device, etc.

At step 740, the process attempts to identify one or more occupants that are in usage proximity to device based on the device characteristics as found in the device's metadata. The occupants that are in usage proximity of the device are retrieved from memory area 545. At step 745, the process identifies any user that might be assigned to device, such as a desktop computer system or printer located in the occupant's office. Step 745 retrieves assigned devices from data store 750. The process determines as to whether any occupants were found to be users of the selected device (decision 755). If any occupants were found to be users of the selected device, then decision 755 branches to the 'yes' branch to perform steps 760 through 780. On the other hand, if not any users of selected device, then decision 755 branches to the 'no' branch bypassing steps 760 through 780.

If any occupants were found to be users of the selected device, then the first such occupant is selected at step 760. At step 770, the process connects the occupant node corresponding to the selected occupant to the device node of the selected device. Step 770 stores the connection between the selected occupant node and the selected device node in the attribution graph that is stored in memory area 555.

The process next determines as to whether there are more occupants to connect to the selected device based on the occupants' proximity to the device and the device's metadata (decision 780). If there are more occupants to connect to the selected device, then decision 780 branches to the 'yes' branch which loops back to step 760 to select the next occupant that is a user of the selected device and make the connection as described above. This looping continues until there are no more occupants to connect to the selected device, at which point decision 780 branches to the 'no' branch exiting the loop.

For the outer loop, the process determines as to whether there are more energy consuming devices to process (decision 790). If there are more energy consuming devices to process, then decision 790 branches to the 'yes' branch which loops back to step 725 to select and process the next device. This looping continues until there are no more energy consuming devices to process, at which point decision 790 branches to the 'no' branch exiting the loop. FIG. 7 processing thereafter returns to the calling routine (see FIG. 5) at 795.

FIG. 8 is a flowchart showing steps that compute occupant-based energy usage and waste. FIG. 8 processing commences at 800 and shows the steps taken by a process that computes occupant-based energy usage and waste. At step 810, the process selects the first device and retrieves the selected device's energy consumption data from memory area 555. The device, and its energy consumption, are retrieved from memory area 525.

The process determines as to whether there are any connections between the selected device and one or more occupants (decision 820). If there are any connections, then decision 820 branches to the 'yes' branch to perform occupant energy attribution (step 340). On the other hand, if there are no connections between the selected device and occupants, then decision 820 branches to the 'no' branch to perform device energy waste identification (step 350).

During occupant energy attribution processing (step 340), two sub-steps are performed. At step 830, the process retrieves the number of occupants that were found to be users of the selected device, and at step 840, the process attributes a proportional share of the energy consumed by device to each of the occupants that were found to be users of the device. The amount of energy attributed to each of the occupants is stored in memory area 555.

At step 350, the process identifies devices that are not being used and, thus, wasting energy. At sub-step 850, the process tracks wasted energy consumed by this device. The amount of wasted energy is stored in memory area 555 and is also reflected in energy waste report 570.

The process determines as to whether there are more energy consuming devices to select and process (decision 860). If there are more energy consuming devices to select and process, then decision 860 branches to the 'yes' branch which loops back to step 810 to select and process the next device as described above. This looping continues until there are no more energy consuming devices to select and process, at which point decision 860 branches to the 'no' branch exiting the loop. At predefined process 870, the process performs the Occupant Based Energy Consumption Reporting routine (see FIG. 9 and corresponding text for processing details). FIG. 8 processing thereafter returns to the calling routine (see FIG. 5) at 895.

Figure 9:
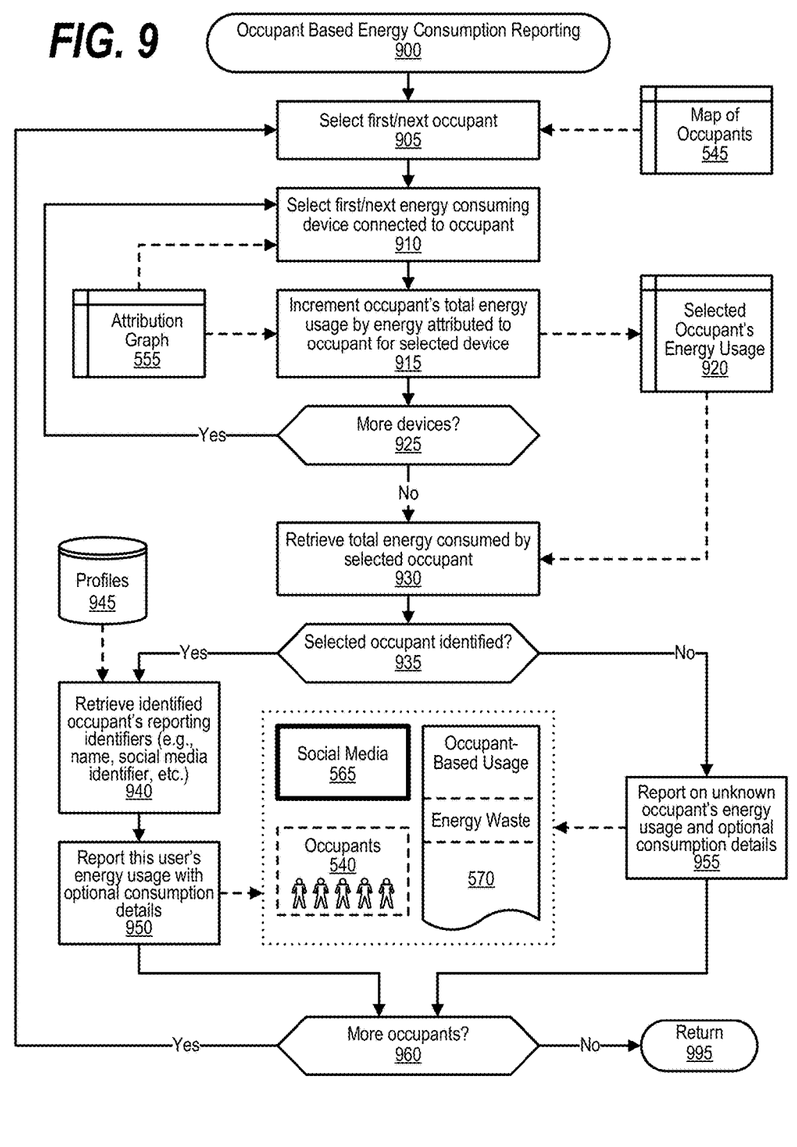
FIG. 9 is a flowchart showing steps that report occupant-based energy consumption.

FIG. 9 is a flowchart showing steps that report occupant-based energy consumption. FIG. 9 processing commences at 900 and shows the steps taken by a process that performs Occupant Based Energy Consumption Reporting. At step 905, the process selects the first occupant from memory area 545. At step 910, the process selects the first energy consuming device connected to the selected occupant.

At step 915, the process increments the occupant's total energy usage by the amount of energy attributed to the selected occupant for selected device. The energy attributed to the selected occupant is retrieved from memory area 555 and the accumulated total amount of energy attributed to the selected occupant is stored in memory area 920.

The process determines as to whether there are more devices that are connected to the selected occupant (decision 925). If there are more devices that are connected to the selected occupant, then decision 925 branches to the 'yes' branch which loops back to step 910 to select and process the energy attribution for the next device that is connected to this occupant. This looping continues until there are no more devices that are connected to the selected occupant, at which point decision 925 branches to the 'no' branch exiting the loop.

At step 930, the process retrieves the total amount of energy attributed to the selected occupant. The process next determines as to whether the selected occupant was able to be identified during earlier identification processing (decision 935). If the selected occupant was able to be identified selected occupant was able to be identified, then decision 935 branches to the 'yes' branch to perform steps 940 and 950. On the other hand, if the selected occupant was unable to be identified, then decision 935 branches to the 'no' branch to perform step 955.

If the selected occupant was able to be identified then, at step 940, the process retrieves the identified occupant's reporting identifiers (e.g., the occupant's name, social media identifier, email address, other contact information, etc.). The occupant's data is retrieved from a profile that is retrieved from data store 945. At step 950, the process reports this occupant's energy usage with optional consumption details. The reporting can be made to any number of outlets such as social media websites 565, the occupant (email, phone, etc.), and reports 570.

On the other hand, if the selected occupant was unable to be identified then, at step 955, the process reports on the unknown occupant's energy usage and optional consumption details. The reporting can be made to any number of outlets such as social media websites 565, managers that oversees energy usage, and reports 570.

The process determines as to whether there are more occupants in memory area 545 that need to be selected and processed (decision 960). If there are more occupants to process, then decision 960 branches to the 'yes' branch which loops back to step 905 to select and process the next occupant as described above. This looping continues until there are no more occupants to select, at which point decision 960 branches to the 'no' branch exiting the loop. FIG. 9 processing thereafter returns to the calling routine (see FIG. 8) at 995.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method executed by an information handling system comprising one or more processors and a memory, the method comprising:
   receiving, by one of the processors, sensory data from one or more proximity detection sensors, wherein the sensory data corresponds to a plurality of occupants located within an area;
   generating, by one of the processors, an occupant map based upon the captured sensory data, wherein the occupant map identifies a plurality of current occupant locations corresponding to the plurality of occupants;
   receiving, by one of the processors, a plurality of energy consumption values corresponding to a plurality of energy consuming devices;
   identifying, by one of the processors, a device location pertaining to each of the plurality of energy consuming devices, resulting in a plurality of device locations;
   retrieving, by one of the processors, device metadata corresponding to the plurality of energy consuming devices, wherein the device metadata comprises a plurality of usage proximity ranges corresponding to the plurality of energy consuming devices;
   mapping, by one of the processors, the plurality of occupants to the plurality of energy consuming devices based on evaluating the occupant map against the plurality of device locations and the corresponding plurality of usage proximity ranges;
   attributing, by one of the processors, an amount of energy consumed by each of the plurality of occupants based on their mapped at least one of the plurality of energy consuming devices and corresponding at least one of the plurality of energy consumption values; and
   reporting, by one of the processors, the attributed amount of energy consumed by each of the one or more occupants to one or more entities selected from the group consisting of a social media website, a manager, and one or more of the plurality of occupants.

2. The method of claim 1 further comprising:
   identifying a set of the plurality of energy consuming devices that is not attributed to any of the occupants; and
   reporting an energy waste corresponding to the identified set of energy consuming devices.

3. The method of claim 1 further comprising:
   generating a graph with an occupant node corresponding to each of the received current occupant locations of the plurality of occupants;
   adding a device node corresponding to each of the plurality of energy consuming devices; and
   connecting the occupant nodes with the device nodes based on the current occupant locations of the plurality of occupants and the device locations.

4. The method of claim 3 further comprising:
   retrieving a set of occupant assigned devices that link one or more of the plurality of occupants to one or more of the plurality of energy consuming devices; and
   connecting the occupant nodes linked to the occupant assigned devices to the respective energy consuming devices regardless of the current location of the respective occupants.

5. The method of claim 3 wherein the amount of energy consumed includes a total amount of energy consumed by each of the plurality of occupants and an energy amount attributed to each of the plurality of occupants for each of the plurality of energy consuming device nodes connected to each of the occupant nodes.

6. An information handling system comprising:
one or more processors;
a memory coupled to at least one of the processors; and
a set of instructions stored in the memory and executed by at least one of the processors, wherein the set of instructions perform actions comprising:
receiving, by one of the processors, sensory data from one or more proximity detection sensors, wherein the sensory data corresponds to a plurality of occupants located within an area;
generating, by one of the processors, an occupant map based upon the captured sensory data, wherein the occupant map identifies a plurality of current occupant locations corresponding to the plurality of occupants;
receiving, by one of the processors, a plurality of energy consumption values corresponding to a plurality of energy consuming devices;
identifying, by one of the processors, a device location pertaining to each of the plurality of energy consuming devices, resulting in a plurality of device locations;
retrieving, by one of the processors, device metadata corresponding to the plurality of energy consuming devices, wherein the device metadata comprises a plurality of usage proximity ranges corresponding to the plurality of energy consuming devices;
mapping, by one of the processors, the plurality of occupants to the plurality of energy consuming devices based on evaluating the occupant map against the plurality of device locations and the corresponding plurality of usage proximity ranges;
attributing, by one of the processors, an amount of energy consumed by each of the plurality of occupants based on their mapped at least one of the plurality of energy consuming devices and corresponding at least one of the plurality of energy consumption values; and
reporting, by one of the processors, the attributed amount of energy consumed by each of the one or more occupants to one or more entities selected from the group consisting of a social media website, a manager, and one or more of the plurality of occupants.

7. The information handling system of claim 6 wherein the actions further comprise:
identifying a set of the plurality of energy consuming devices that is not attributed to any of the occupants; and
reporting an energy waste corresponding to the identified set of energy consuming devices.

8. The information handling system of claim 6 wherein the actions further comprise:
generating a graph with an occupant node corresponding to each of the received current occupant locations of the plurality of occupants;
adding a device node corresponding to each of the plurality of energy consuming devices; and
connecting the occupant nodes with the device nodes based on the current occupant locations of the plurality of occupants and the device locations.

9. The information handling system of claim 8 wherein the actions further comprise:
retrieving a set of occupant assigned devices that link one or more of the plurality of occupants to one or more of the plurality of energy consuming devices; and
connecting the occupant nodes linked to the occupant assigned devices to the respective energy consuming devices regardless of the current location of the respective occupants.

10. The information handling system of claim 8 wherein the amount of energy consumed includes a total amount of energy consumed by each of the plurality of occupants and an energy amount attributed to each of the plurality of occupants for each of the plurality of energy consuming device nodes connected to each of the occupant nodes.

11. A computer program product stored in a computer readable storage medium, comprising computer instructions that, when executed by an information handling system, causes the information handling system to perform actions comprising:
receiving sensory data from one or more proximity detection sensors, wherein the sensory data corresponds to a plurality of occupants located within an area;
generating an occupant map based upon the captured sensory data, wherein the occupant map identifies a plurality of current occupant locations corresponding to the plurality of occupants;
receiving a plurality of energy consumption values corresponding to a plurality of energy consuming devices;
identifying a device location pertaining to each of the plurality of energy consuming devices, resulting in a plurality of device locations;
retrieving device metadata corresponding to the plurality of energy consuming devices, wherein the device metadata comprises a plurality of usage proximity ranges corresponding to the plurality of energy consuming devices;
mapping the plurality of occupants to the plurality of energy consuming devices based on evaluating the occupant map against the plurality of device locations and the corresponding plurality of usage proximity ranges;
attributing an amount of energy consumed by each of the plurality of occupants based on their mapped at least one of the plurality of energy consuming devices and corresponding at least one of the plurality of energy consumption values; and
reporting the attributed amount of energy consumed by each of the one or more occupants to one or more entities selected from the group consisting of a social media website, a manager, and one or more of the plurality of occupants.

12. The computer program product of claim 11 wherein the actions further comprise:
identifying a set of the plurality of energy consuming devices that is not attributed to any of the occupants; and
reporting an energy waste corresponding to the identified set of energy consuming devices.

13. The computer program product of claim 11 wherein the actions further comprise:
generating a graph with an occupant node corresponding to each of the received current occupant locations of the plurality of occupants;
adding a device node corresponding to each of the plurality of energy consuming devices; and
connecting the occupant nodes with the device nodes based on the current occupant locations of the plurality of occupants and the device locations.

14. The computer program product of claim 13 wherein the actions further comprise:
  retrieving a set of occupant assigned devices that link one or more of the plurality of occupants to one or more of the plurality of energy consuming devices; and
  connecting the occupant nodes linked to the occupant assigned devices to the respective energy consuming devices regardless of the current location of the respective occupants.

* * * * *